United States Patent [19]

Nakanishi et al.

[11] Patent Number: 4,821,135

[45] Date of Patent: Apr. 11, 1989

[54] THERMOSETTING RESIN STATIONARY TAPE GUIDES FOR MAGNETIC TAPE CASSETTES

[75] Inventors: Masaru Nakanishi; Arata Kitamura; Masashi Sakurai; Masaaki Asanuma, all of Osaka, Japan

[73] Assignee: Nitto Electric Industrial Co., Ltd., Osaka, Japan

[21] Appl. No.: 844,495

[22] Filed: Mar. 26, 1986

[30] Foreign Application Priority Data

Mar. 26, 1985 [JP] Japan .................................. 60-62892

[51] Int. Cl.$^4$ ....................... G11B 23/02; G11B 15/60
[52] U.S. Cl. ......................... 360/132; 360/130.2; 360/130.33; 242/199; 226/196
[58] Field of Search ................ 360/130.2, 130.33, 132; 226/196, 157 R; 242/199

[56] References Cited

U.S. PATENT DOCUMENTS

| | | | |
|---|---|---|---|
| 2,748,099 | 5/1956 | Bruner et al. | 524/439 X |
| 2,761,854 | 9/1956 | Coler | 523/209 |
| 4,062,484 | 12/1977 | Rausch et al. | 226/196 X |
| 4,313,551 | 2/1982 | Umehara | 360/132 |
| 4,466,582 | 8/1984 | Shiba | 242/199 |
| 4,570,197 | 2/1986 | Hakanson et al. | 360/132 X |

FOREIGN PATENT DOCUMENTS 58-139358 8/1983 Japan .................................. 360/130.2

OTHER PUBLICATIONS

IBM Technical Disclosure Bulletin, vol. 24, No. 10, Mar. 1982, "Tape Guide Surface Coating", by Clegg.

Primary Examiner—Stuart N. Hecker
Assistant Examiner—Alfonso Garcia
Attorney, Agent, or Firm—Sughrue, Mion, Zinn, Macpeak & Seas

[57] ABSTRACT

A tape guide for magnetic tape cassettes, comprising a thermosetting resin composition, such as a polyester resin having a glass transition point of not lower than 100° C. containing an inorganic filler such as silicon powder and, optionally, a resin powder such as a tetrafluoroethylene resin powder in a proportion of from 60 to 75% by weight based on the total composition. The tape guide has an increased thermal conductivity of $10 \times 10^{-4}$ cal/cm.deg.sec or more and a low coefficient of friction and is, therefore, free from undesirable frictional heat generation.

14 Claims, 1 Drawing Sheet

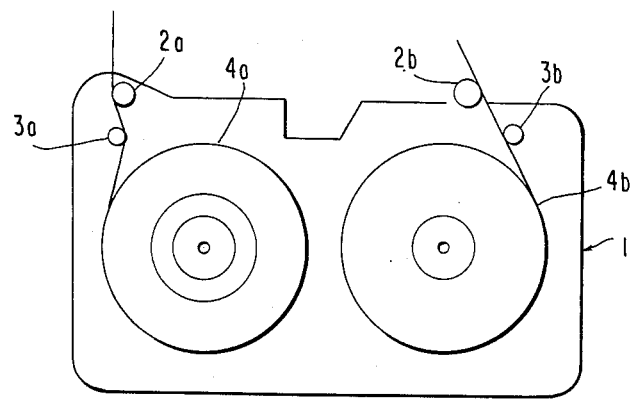

THERMOSETTING RESIN STATIONARY TAPE GUIDES FOR MAGNETIC TAPE CASSETTES

FIELD OF THE INVENTION

This invention relates to improved tape guides for a magnetic tape cassette and, more particularly, to thermosetting resin tape guides for a magnetic tape cassette, which have increased thermal conductivity.

BACKGROUND OF THE INVENTION

A cassette tape that is used in magnetic recording devices is composed of, for example, cassette case 1, two tape guides 2a and 2b, two tape guide posts 3a and 3b, take-up reel 4a and supply reel 4b as shown in the accompanying drawing. The tape guides are used for the purpose of maintaining the position of magnetic tape constant to ensure safe and smooth run of the magnetic tape on the magnetic recording devices.

Conventionally employed tape guides are usually made of hard chrome-plated stainless steel having a surface roughness of 0.5 μm or less. However, a demand for less expensive tape guides prompted studies on use of resins as materials for tape guides, and tape guide pins made of polyacetal resins, polysulfone resins, and the like have so far been developed.

These resin tape guides, however, fail to effectively dissipate the heat produced by friction with the magnetic tape due to their low thermal conductivity, which results in significant heat accumulation. Therefore, fears are entertained as to deformation of tape guides or adverse influences on magnetic tapes due to generation of thermal stress.

SUMMARY OF THE INVENTION

An object of this invention is to provide a tape guide made or resins that is free from the above-described disadvantages.

The invention relates to a tape guide for cassettes, which comprises a thermosetting resin composition containing an inorganic filler in a proportion of from 60 to 75% by weight based on the total composition.

BRIEF DESCRIPTION OF THE ACCOMPANYING DRAWING

FIG. 1 illustrates a typical example of magnetic recording tape cassette in which the symbols 2a and 2b indicate tape guides.

DETAILED DESCRIPTION OF THE INVENTION

The term "cassette" as used herein means magnetic recording tape cassettes for video recording such as VHS and β-type video cassettes, and a compact cassette.

In order to assure resistance to the heat of friction as described above, the thermosetting resins which can be used in the present invention are those having a glass transition point of not lower than 100° C. usually including epoxy resins. Phenol resins, polyester resins, diallyl phthalate resins, etc., may also be used.

In the present invention, an inorganic filler is incorporated into the resin for the purpose of increasing thermal conductivity of tape guides to $10 \times 10^{-4}$ cal/cm.deg.sec or more. The inorganic filler is used in a proportion of from 60 to 75% by weight based on the total composition. If the proportion of the inorganic filler in the resin composition is less than 60% by weight, the above purpose as to thermal conductivity cannot be fulfilled, and proportions more than 75% by weight reduce mechanical strength.

In order to improve abrasion resistance of tape guides, the inorganic filler to be used preferably includes hard inorganic fillers having a Rockwell hardness (C scale) of from 60 to 85, such as silica powders, alumina powders, nickel powders, silicon carbide powders, glass beads, etc. The particle size of the inorganic filler ranges from 0.1 to 100 μm, preferably from 0.1 to 40 μm, and most preferably from 0.1 to 30 μm, from the standpoint of low frictional characteristics (surface smoothness) of tape guides.

Low frictional characteristics of tape guides can be ensured by replacing a part of the inorganic filler with a low frictional organic or inorganic filler having good slippage, such as molybdenum disulfide powders, carbon powders, silicon carbide powders, graphite powders, and the like. In this case, the particle size of these fillers is in the same range as recited above, i.e., from 0.1 to 100 μm, preferably from 0.1 to 40 μm. A weight ratio of the hard inorganic filler to the slippery inorganic filler (low frictional inorganic filler) is usually from 15/1 to 5/2, and preferably from 5/1 to 5/2.

It is also possible to use a resin powder having a low efficient of friction and a melting point higher than the curing temperature of the above-described thermosetting resin, such as tetrafluoroethylene resin powders, in place of a part of the aforesaid slippery inorganic filler. Such being the case, the resin powder is added in an amount of from 1 to 5% by weight based on the total composition, and the total amount of the inorganic filler and the resin powder is adjusted to 60 to 75% by weight based on the total composition. Amounts less than 1% by weight of the resin powder do not bring about effective reduction of the coefficient of friction as expected. On the other hand, the desired thermal conductivity of $10 \times 10^{-4}$ cal/cm.deg.sec can not be maintained with amounts more than 5% by weight of the resin powder. The particle size of the resin powder ranges from 0.1 to 10 μm, preferably from 0.5 to 3 μm.

In order to prevent static electrification due to friction between the tape guides and an electromagnetic tape, it is preferable that the surface insulation resistance of the tape guide be not more than $10^8$ Ω. To this effect, nickel powders, molybdenum powders, carbon powders, graphite powders, etc., may be employed.

The inorganic fillers which can be used in the present invention preferably have a Wadell's degree of sphericity of from 0.5 to 1.0. Use of such inorganic fillers further improves slip of the resulting tape guide. In this case, the particle size of the fillers is not particularly limited, but is preferably 40 μm or less, and more preferably of from 0.1 to 30 μm. The terminology "Wadell's degree of sphericity" as herein used means an index obtained by dividing a diameter of a circle having the same area as a projected area of a particle by a diameter of the smallest circle circumscribing about a projected area of a particle. As the index gets close to 1, the particle approaches near to a true sphere (cf. *Kagaku Kogaku Binran*, Maruzen).

This invention will now be illustrated in greater detail with reference to the following examples, but it should be understood that they are not intended to limit the present invention.

EXAMPLE 1

An epoxy resin composition consisting of an epoxy resin (Epikote 1001) and, as a curing agent, diaminodiphenylmethane, a release agent and a silica powder as a hard inorganic filler were mixed in proportions shown in Table 1 and kneaded in a roll mill at 70° to 80° C. The resulting molding material was shaped into cylinderical tape guides having an outer diameter of 6±0.05 mm, an inner diameter of 4.8±0.05 mm and a height of 16±0.05 mm, followed by heat-curing at 150° C.

EXAMPLE 2

The same procedure as described in Example 1 was repeated except for using a nickel powder in place of the silica powder.

EXAMPLES 3 TO 5

The same procedure as described in Example 1 was repeated except for using, as inorganic fillers, a hard inorganic filler selected fdrom a silica powder and an alumina powder and a low frictional inorganic filler selected from a carbon fiber powder, a molybdenum disulfide powder and a silicon carbide powder in proportions shown in Table 1.

EXAMPLE 6

The same procedure as described in Example 1 was repeated except for replacing a part of the silica powder with a polytetrafluoroethylene powder as shown in Table 1 for the purpose of reducing the coefficient of friction.

Each of the tape guides obtained in Examples 1 to 6 and a conventional tape guide produced from a polyacetal resin was measured for thermal conductivity, and the results obtained are shown in Table 1.

Further, a magnetic tape was run on each of these tape guides and the coefficient of friction under a tensile load of 100 g was measured. The results thus obtained are also shown in Table 1.

TABLE 1

|  | Ex. 1 | Ex. 2 | Ex. 3 | Ex. 4 | Ex. 5 | Ex. 6 | Comparison |
|---|---|---|---|---|---|---|---|
| Epoxy Resin Composition (wt %) | 32.6 | 32.6 | 32.6 | 32.6 | 32.6 | 32.6 | polyacetal |
| Release Agent (wt %) | 0.9 | 0.9 | 0.9 | 0.9 | 0.9 | 0.9 | |
| Hard Filler (wt %): | | | | | | | |
| Silica (20 μm)* | 66.5 | — | — | 46.5 | 65.5 | 63.5 | |
| Alumina (10 μm)* | — | — | 46.5 | — | — | — | |
| Nickel (5 μm)* | — | 66.5 | — | — | — | — | |
| Low Frictional Filler (wt %): | | | | | | | |
| Carbon Fiber (7 μm)* | — | — | 20.0 | — | — | — | |
| Molybdenum Disulfide (5 μm)* | — | — | — | 20.0 | — | — | |
| Silicon Carbide (10 μm)* | — | — | — | — | 1.0 | — | |
| Tetrafluoroethylene (1 μm)* (wt %) | — | — | — | — | — | 3.0 | |
| Thermal Conductivity ($\times 10^{-4}$ cal/cm · deg · sec) | 10 | 30 | 20 | 25 | 15 | 10 | 5 |
| Coefficient of Friction | 0.17–0.27 | 0.20–0.25 | 0.20–0.30 | 0.15–0.20 | 0.20–0.25 | 0.20–0.25 | 0.20–0.30 |
| Surface Insulation Resistance (Ω) | $10^{15}$ | $10^8$ | $10^5$ | $10^{10}$ | $10^{15}$ | $10^{15}$ | $10^{15}$ |

Note:
*average particle size

EXAMPLE 7

A mixture of 25% by weight of a thermosetting epoxy resin and 75% by weight of an amorphous silica powder having an average particle size of 16 μm and a Wadell's degree of sphericity of 0.7 was kneaded in a roll mill to prepare a molding composition. The composition was charged in a mold and cured by heating at 150° C. under pressure to obtain tape guides having an inner diameter of 4.3 mm, an outer diameter of 6.0 mm and a height of 16.0 mm.

For comparison, tape guides were produced in the same manner as described in Example 7 but using no inorganic filler.

The resulting tape guides were evaluated for releasability from a mold after curing, abrasion resistance, coefficient of friction and running stability in high-speed running of a video tape. The results obtained are shown in Table 2 below. In Table 2, the coefficient of friction is an average of 10 samples.

TABLE 2

|  | Example 7 | Comparison |
|---|---|---|
| Releasabilty | good | slightly poor |
| Abrasion Resistance | good | slightly poor |
| Coefficient of Fricton | 0.25 | 0.38 |
| Running Stability | good | slightly poor |

EXAMPLE 8

A mixture of 27% by weight of a thermosetting epoxy resin, 64% by weight of an amorphous silica powder having an average particle size of 16 μm and a Wadell's degree of sphericity of 0.7 and 9% by weight of a graphite powder was kneaded in a roll mill to prepare a molding composition. The composition was molded in the same manner as in Example 7 to produce tape guides.

EXAMPLE 9

A mixture of 28% by weight of a thermosetting epoxy resin, 66% by weight of an amorphous silica powder having an average particle size of 16 μm and a Wadell's degree of sphericity of 0.7 and 6% by weight of a polytetrafluoroethylene fine powder having a particle size of 1 μm was kneaded in a roll mill to prepare a molding composition. The composition was molded in the same manner as in Example 7 to obtain tape guides.

EXAMPLE 10

A mixture of 27% by weight of a thermosetting epoxy resin, 64% by weight of an amorphous silica powder having an average particle size of 16 μm and a Wadell's degree of sphericity of 0.7, 6% by weight of a graphite powder and 3% by weight of a polyetetrafluoroethylene fine powder having a particle size of 1 μm was kneaded in a roll mill to prepare a molding composition. The composition was molded in the same manner as in Example 7 to obtain tape guides Each of the tape guides obtained in Examples 8 to 10 was evaluated in the same manner as in Example 7. The surface resistance of these samples was also measured. The results thus obtained are shown in Table 3 below.

TABLE 3

|  | Example 8 | Example 9 | Example 10 |
| --- | --- | --- | --- |
| Releasability | good | good | good |
| Abrasion Resistance | good | good | good |
| Coefficient of Friction | 0.15 | 0.19 | 0.13 |
| Surface Resistance ($\Omega$) | $10^6$ | $10^{15}$ | $10^7$ |
| Running Stabililty | excellent | excellent | excellent |

As described above, since the tape guides according to the present invention comprise a thermosetting resin having incorporated therein an inorganic filler, they have an increased thermal conductivity and a sufficiently reduced coefficient of friction, i.e, 0.3 or less, thus satisfactorily preventing heat generation due to friction and eliminating disadvantages associated with the conventional tape guides made of resins.

Further, the results of measurement of surface insulation resistance prove that use of a conductive filler as an inorganic filler is effective to prevent static electrification.

Furthermore, a spherical inorganic filler of a shape near to a true sphere which is incorporated into the resin forms micro roughness on the surface of the tape guide, on which a tape is run. As a result, a tape makes a smooth run along the tape guides without gettig scratches and with little abrasion and with reduced friction heat generation. In particular, addition of a low frictional inorganic filler having good slip characteristics, such as graphite, a polyetetrafluoroethylene fine powder, etc., further decreases resistance to slippage and improves running properties.

Accordingly, the tape guides according to the present invention, though being made of resins, possess performance characteristics equal to the conventional tape guides made of hard chrome-plated stainless steel that have hitherto been considered the most excellent, and also have the advantage of being light-weight.

While the invention has been described in detail and with reference to specific embodiments thereof, it will be apparent to one skilled in the art that various changes and modifications can be made therein without departing from the spirit and scope thereof.

What is claimed is:

1. A stationary tape guide for magnetic tape cassettes comprising a thermosetting resin composition containing an inorganic filler in a proportion of from 60 to 75% by weight based on the total composition.

2. A tape guide as in claim 1, wherein said inorganic filler is a hard inorganic filler sufficiently hard to withstand sliding contact with VCR tape under conditions of normal use substantially without abbrading.

3. A tape guide as in claim 2, wherein said inorganic filler has a Rockwell hardness of from 60 to 85 according to C scale.

4. A tape guide as in claim 3, wherein said inorganic filler is selected from a silica powder, an alumina powder, a nickel powder, a silicon carbide powder and glass beads.

5. A tape guide as in claim 1, wherein said inorganic filler is a mixture of a hard organic filler sufficiently hard to withstand sliding contact with VCR tape under conditions of normal use substantially without abbrading and a low frictional inorganic filler, said low frictional inorganic filler selected from the group consisting of molebdynum disulfide particles, carbon powder, silicon carbide particles, and graphite powder.

6. A tape guide as in claim 5, wherein a weight proportion of the hard inorganic filler to the low frictional inorganic filler is from 15/1 to 5/2.

7. A tape guide as in claim 6, wherein a weight proportion of the hard inorganic filler to the low frictional inorganic or organic filler is from 5/1 to 5/2.

8. A tape guide as in claim 1, wherein said composition further contains from 1 to 5% by weight of a resin powder having a low coefficient of friction and having a melting point higher than the curing temperature of said thermosetting resin, in place of a part of the inorganic filler.

9. A tape guide as in claim 8, wherein said resin powder is a polytetrafluoroethylene powder.

10. A tape guide as in claim 1, wherein said inorganic filler has a Wadell's degree of sphericity of from 0.5 to 1.0.

11. A tape guide as in claim 1, wherein said inorganic filler has an average particle size of from 0.1 to 100 $\mu$m.

12. A tape guide as in claim 11, wherein said inorganic filler has an average particle size of from 0.1 to 40 $\mu$m.

13. A tape guide as in claim 8, wherein the resin powder has a particle size of from 0.1 to 10 $\mu$m.

14. A tape guide as in claim 8, wherein the total amount of the inorganic filler and the resin powder is from 60 to 75% by weight based on the total composition.

* * * * *